United States Patent
Drys et al.

(10) Patent No.: US 12,511,888 B2
(45) Date of Patent: Dec. 30, 2025

(54) COMPUTER-IMPLEMENTED METHOD OF HANDLING AN EMERGENCY INCIDENT, COMMUNICATION NETWORK, AND EMERGENCY PROCESSING UNIT

(71) Applicant: ATOS Public Safety, LLC, Irving, TX (US)

(72) Inventors: Nikolaos Drys, Athens (GR); Aristeidis Giachalis, Athens (GR); Konstantinos Katsimingos, Athens (GR); Dimitrios Talasoglou, Nea Makri (GR); Aikaterini Skouta, Argyroupoli (GR); Anastasios Talampekos, Athens (GR)

(73) Assignee: ATOS PUBLIC SAFETY, LLC, Irving, TX (US)

( * ) Notice: Subject to any disclaimer, the term of this patent is extended or adjusted under 35 U.S.C. 154(b) by 189 days.

(21) Appl. No.: 17/585,896

(22) Filed: Jan. 27, 2022

(65) Prior Publication Data

US 2022/0245768 A1  Aug. 4, 2022

(30) Foreign Application Priority Data

Jan. 29, 2021  (EP) .................................. 21154338

(51) Int. Cl.
*G06V 10/82* (2022.01)
*G06T 7/50* (2017.01)

(52) U.S. Cl.
CPC ................ *G06V 10/82* (2022.01); *G06T 7/50* (2017.01); *G06T 2207/20084* (2013.01); *G06T 2207/30232* (2013.01)

(58) Field of Classification Search
None
See application file for complete search history.

(56) References Cited

U.S. PATENT DOCUMENTS

| 10,733,457 B1 * | 8/2020 | Agnihotram ..... G08B 13/19613 |
| 10,789,288 B1 * | 9/2020 | Ranzinger ................. G06T 7/70 |
| 2019/0313230 A1 * | 10/2019 | MacGabann ........... H04L 67/56 |

FOREIGN PATENT DOCUMENTS

| CN | 111597263 A * | 8/2020 | |
| EP | 3495992 A1 * | 6/2019 | ........... G05D 1/0214 |

OTHER PUBLICATIONS

Zacchi, Anna, Ana Goulart, and Walt Magnussen. "A framework for securing the signaling plane in the emergency services IP network (ESINet)." 2011 IEEE Consumer Communications and Networking Conference (CCNC). IEEE, 2011. (Year: 2011).*

(Continued)

*Primary Examiner* — Vincent Rudolph
*Assistant Examiner* — Meredith Taylor
(74) *Attorney, Agent, or Firm* — Meagher Emanuel Laks Goldberg & Liao, LLP (57) ABSTRACT

A computer-implemented method of handling an emergency incident can include receiving information on an emergency incident that includes at least one image of the emergency incident, applying a Convolutional Neural Network (CNN) object recognition and classification process for identifying and marking objects on the at least one image that are related to the emergency incident and that may cause at least one secondary hazardous situation, processing the data relating to the identified and marked objects by applying a deep learning algorithm to the data in a Relational Network (RN) architecture, wherein the image on the basis of the identified and marked objects is correlated to a set of recognized objects in a database for classifying the emergency. A communication network, communication apparatus, and an emergency processing unit are also provided. Embodiments of such machines and systems can be configured to implement embodiments of the method.

11 Claims, 5 Drawing Sheets

(56) References Cited

OTHER PUBLICATIONS

Li C, Zheng W, Liu H, Chen Z, Cai F, Lv C. Monitoring of Potential Safety Hazards of Transmission Lines Based on Object Detection. In2020 International Conference on Big Data, Artificial Intelligence and Internet of Things Engineering (ICBAIE) Jun. 12, 2020 (pp. 383-387). IEEE. (Year: 2020).*
European Search Report for EP21 15 4338 dated Jun. 16, 2021.

* cited by examiner

- mite
- fly
- black widow
- cockroach

FIG. 2C

- container ship
- frigate
- passenger ship
- ferry

FIG. 2D

- scooter
- motorbike2
- car
- truck

FIG. 2E

- leopard
- jaguar
- tiger
- cat

COMPUTER-IMPLEMENTED METHOD OF HANDLING AN EMERGENCY INCIDENT, COMMUNICATION NETWORK, AND EMERGENCY PROCESSING UNIT

CROSS-REFERENCE TO RELATED APPLICATIONS

The present application claims priority to European Patent Application No. EP 21 154 338.4, which was filed on Jan. 29, 2021. The entirety of this European Patent Application is incorporated by reference herein.

FIELD

The present invention relates to a computer-implemented method of handling an emergency incident, a communication network, and an emergency processing unit.

BACKGROUND

The Next Generation 9-1-1 (NG9-1-1) project aims at constantly improving public emergency communications services specifically for users of mobile devices. Besides making phone calls to Public Safety Answering Points (PSAP), nowadays, it is also possible to send images, video and other data to the 9-1-1 or PSAP centers.

Accordingly, it is desirable to take a picture of a place at which an emergency incident occurs and send it to the next PSAP to describe the situation and to provide information on the incident. Such visual information gained from photos and/or videos of an emergency location can be intended to assist NG9-1-1 emergency dispatchers to handle such an emergency incident in the most efficient manner.

SUMMARY

We determined that the images received from an emergency location may be of poor quality due to the emergency situation itself, bad weather conditions, or they may be blurry due to movement of the camera. Also, some objects or parts of the image may be indistinguishable or are not apparent to the human eye due to a heavy load of information with respect to the image, even if it is of high quality. Nevertheless, there may be parts of the image that, if combined, may provide critical information to the people handling the emergency at the PSAP, for example, information on possible hidden dangers within the emergency environment.

Therefore, it would be desirable if such hidden dangers are identified in an emergency situation, as this may be crucial to handling the emergency situation by the person that receives the information at the PSAP.

We provide embodiments of a method of handling an emergency incident, a corresponding communication network, and an emergency processing unit which can enable an identification of hidden dangers in an emergency scene presented on an image provided to a PSAP for reporting an emergency incident.

For example, a computer-implemented method of handling an emergency incident reported to a Public Safety Answering Point (PSAP) can include the step of receiving, at the PSAP, information on an emergency incident, the information comprising at least one image of the emergency incident. The emergency incident can be a primary hazardous situation, for example. Embodiments of the method can also include applying a Convolutional Neural Network (CNN) object recognition and classification process for identifying and marking objects on the at least one image that are related to the emergency incident and that may cause at least one secondary hazardous situation and processing the data relating to the identified and marked objects by applying a deep learning algorithm to the data in a Relational Network (RN) architecture (e.g. a Long-Short-Term-Memory (SLTM) architecture). The image, on the basis of the identified objects, can be correlated to a set of recognized objects that are essential for classifying the emergency.

Deep learning technologies can be combined so as to acquire information from the image sent by a user for reporting an emergency incident that might be missed otherwise by a person or an agent handling the case at the PSAP. For instance, a visual recognition machine learning algorithm can be provided that develops relational reasoning between the existing objects shown on the image presenting the emergency scene. This way, when an image is received to report an emergency incident, the PSAP agent will be able to get an insight from the algorithm so as to get a better understanding of the situation and he or she will even be notified of additional hazardous situations emanating from the emergency that would otherwise not have been recognized when handling the primary emergency incident.

According to a preferred embodiment of the invention, the method further comprises a step of applying image processing to the at least one image using image correction software.

According to another preferred embodiment of the invention, the CNN is applied based on convolution and max pooling.

According to still another preferred embodiment of the invention, the method further comprises a step of correlating objects identified on the at least one image of the primary hazardous situation with objects identified on the at least one image that in combination of the objects related to the primary hazardous situation may cause the at least one secondary hazardous situation.

The primary hazardous situation may be a fire, and the objects identified on the at least one image that in combination with the objects related to the primary hazardous situation may cause at least one second hazardous situation (e.g. from inflammable materials or inflammable objects or explosives or the like).

Preferably, the method can further comprise a step of outputting an alert if it is verified that at least one second hazardous situation may occur.

According to another preferred embodiment of the invention, the method further comprises providing a suggestion for handling the first hazardous situation and a suggestion for handling the at least one second hazardous situation.

Moreover, according to the present invention, a communication network adapted for handling emergency incidents is provided. Embodiments of the communication network can include an Emergency Service Network (ESInet) via which information on emergency incidents are transmittable to a PSAP. The communication network can also include an emergency processing unit adapted to carry out the computer-implemented method of handling an emergency incident. It should be appreciated that the PSAP and the emergency processing unit can each be a computer device that includes a processor connected to a non-transitory computer readable medium having code stored thereon. Code can be run by the processor so that the computer device performs a method defined by the code. The PSAP and the emergency processing unit can also include or be connectable to at least one output device (e.g. a display, a printer), at least one input device (a pointer device, a keypad, a button, etc.) or at least one input/output device (e.g. a touchscreen display). Each device can also include at least one transceiver connected to the processor to facilitate communications via at least one network. An example of the at least one network can include the ESInet. Communication apparatuses are also provided. An example of a communication apparatus is the emergency processing unit and/or the PSAP.

Preferably, the emergency processing unit comprises a deep learning unit and an image correction unit.

Moreover, according to the present invention, an emergency processing unit is provided comprising a deep learning unit adapted to carry out the method of handling an emergence unit.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawings include the following:

1, 1' image
2, 2' object on the image
3 deep learning unit
4 communication network
5 image correction unit 5
6 Emergency Service Network (ESINET)
7 PSAP
8 emergency processing unit

DETAILED DESCRIPTION

Figure 1A:
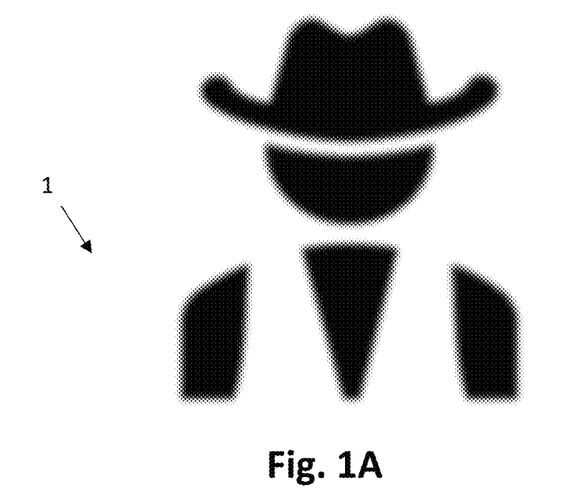
FIG. 1A schematically illustrate a blurry image that may need corrected.
Figure 1B:
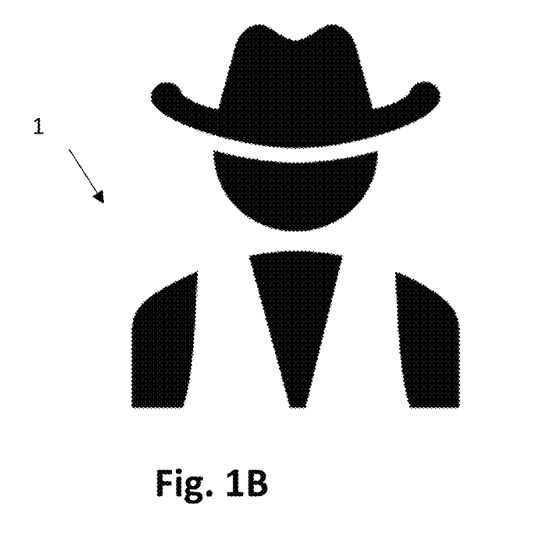
FIG. 1B schematically illustrate a corrected image formed based on the blurry image shown in FIG. 1A.

FIG. 1A and FIG. 1B schematically illustrate how an image 1 can be corrected via an embodiment of our apparatus, which may utilize an embodiment of our method. FIG. 1A shows an image that is received from a caller who has reported an emergency incident to a recipient, for example, a first responder in a Public Safety Answering Point (PSAP). The PSAP is a communication device that can include a processor connected to a non-transitory computer readable medium and at least one transceiver unit as well as at least one input device and/or output device. An example of a PSAP can include a laptop computer, personal computer, telephone, smart phone, or electronic tablet of a caller agent that may be connectable to an emergency services communication network (e.g. an Emergency Service Network, which can also be referred to as an ESINET or an ESInet).

As can be seen from the example image of FIG. 1A, the image received from an emergency caller terminal device at the PSAP can be distorted and/or blurry and the objects of the emergency scene may not be recognized in a sufficient manner so as to assess and handle the emergency situation. Therefore, in a first step, the distorted or blurry image is processed and corrected by using common correction techniques and tools known from prior art so as to improve the visibility of the objects comprised in the image. The result of a corrected image can be seen in FIG. 1B. Here, the man, the image of whom is rather blurry in FIG. 1A, can be recognized very well.

Figure 2A:
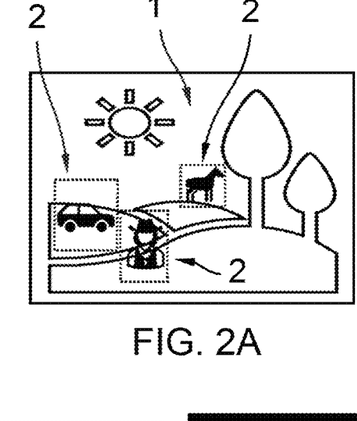
FIGS. 2A and 2B show two images respectively comprising various objects.
Figure 2B:
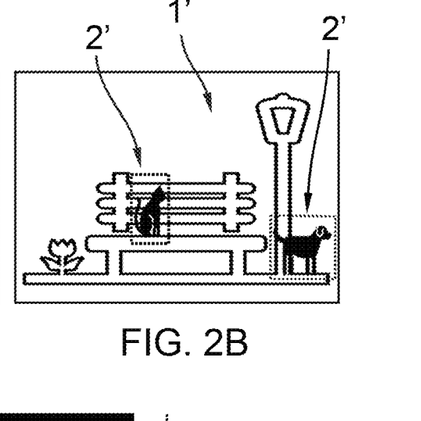
Figure 2C:
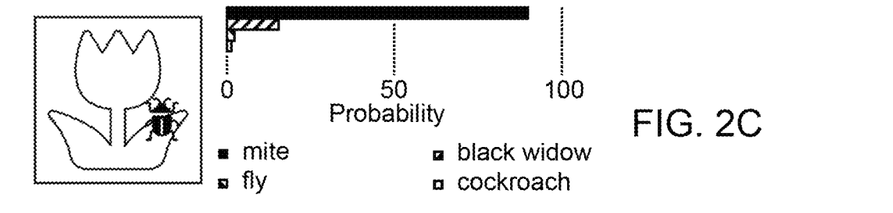
FIGS. 2C-2F show additional images and deep learning algorithm probabities related to identifying an object in each image.
Figure 2D:
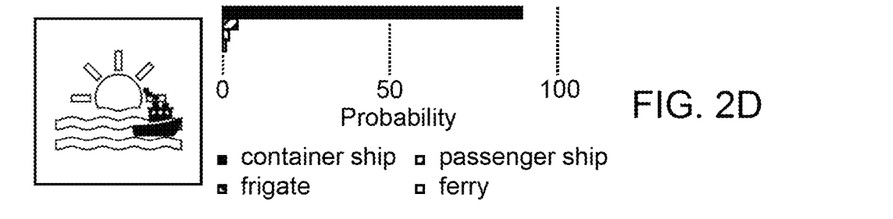
Figure 2E:
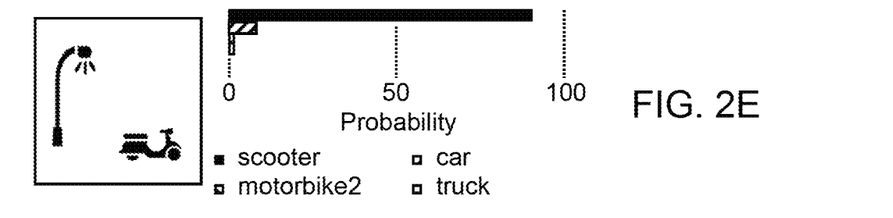
Figure 2F:
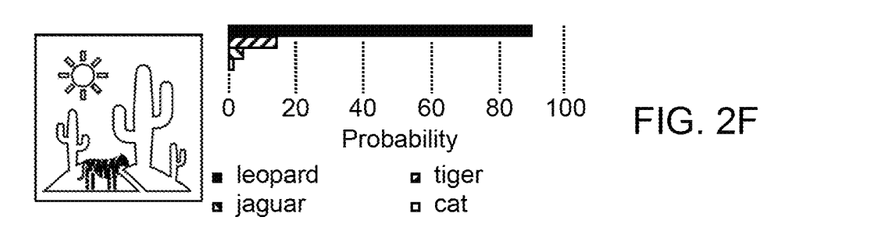

FIGS. 2A and 2B show two different images 1, 1' respectively comprising various objects 2, 2', wherein the objects 2, 2' are surrounded by respective frames. After the first step of correcting an image 1 that has been received in connection with an emergency incident at a PSAP, as described with respect to FIG. 1A and FIG. 1B, in a second step, an object recognition is carried out according to which objects 2, 2' that are present on the image 1, 1' are identified, as indicated by the respective frames, and classified. This object recognition and classification procedure uses a Convolutional Neural Network (CNN) based on convolution and max pooling (machine learning) methods employing existing application programming interfaces (APIs) like TensorFlow (optimized API for building CNNs and defining the layers of the network). The CNN technology can have an enhanced capability of highlighting a set of identifiable entities, here the objects 2, 2' that exist in images, here in the images 1, 1'. For emergency purposes, a dynamic set of identifiable emergency objects can be defined like fire, typhoon, flood, destroyed cars, scattered fragments that can be classified as debris, sharp objects, weapons, humans in distress using, for example, tools like facial recognition and the like. The output of this algorithm can be used to pinpoint which of these objects exist in the image and their respective location in the picture.

As illustrated here, an example of how embodiments of the present technology is able to understand entities in an image given a set of images that contained objects that it is programmed to search for. FIGS. 2C-2F show that the deep learning CNN is able to perform pattern matching in terms of proximity using the objects it was supposed to find (along with the extra mechanisms it uses for object identification). All of the four lower images show the same thing. The first image (FIG. 2C) shows that the deep learning algorithm was matching the given image using a "pool" of four insects. Its output was that the image had a higher matching with the images containing a "mite" while three others had a respective resemblance but the probability of containing "black widow" was way lower than the mite. As to the second image (FIG. 2D), the CNN shows that there is an 90% match with the object "container ship", almost 20% is given for the second object, it was searching for, and there is almost a 0% chance that the image depicted the other two of the "pool". Same with the third image (FIG. 2E) showing the scooter while the fourth image (FIG. 2F) has a small difference in the probabilities of the second object of the pool. In real life, leopard and jaguar actually resemble each other so the output of the CNN gave 90% [100%] to the leopard while giving a 15% of probability to the jaguar. It is in the judgement of the programmer to set a threshold on the probabilities and matches that the algorithm outputs. If some things greatly resemble each other, the deep learning algorithms can give controversial results. In these cases, the programmer has the capability to provide another neural network that focuses on the difference between some objects in order to better distinguish between, for example, a jaguar and a leopard.

Figure 3:
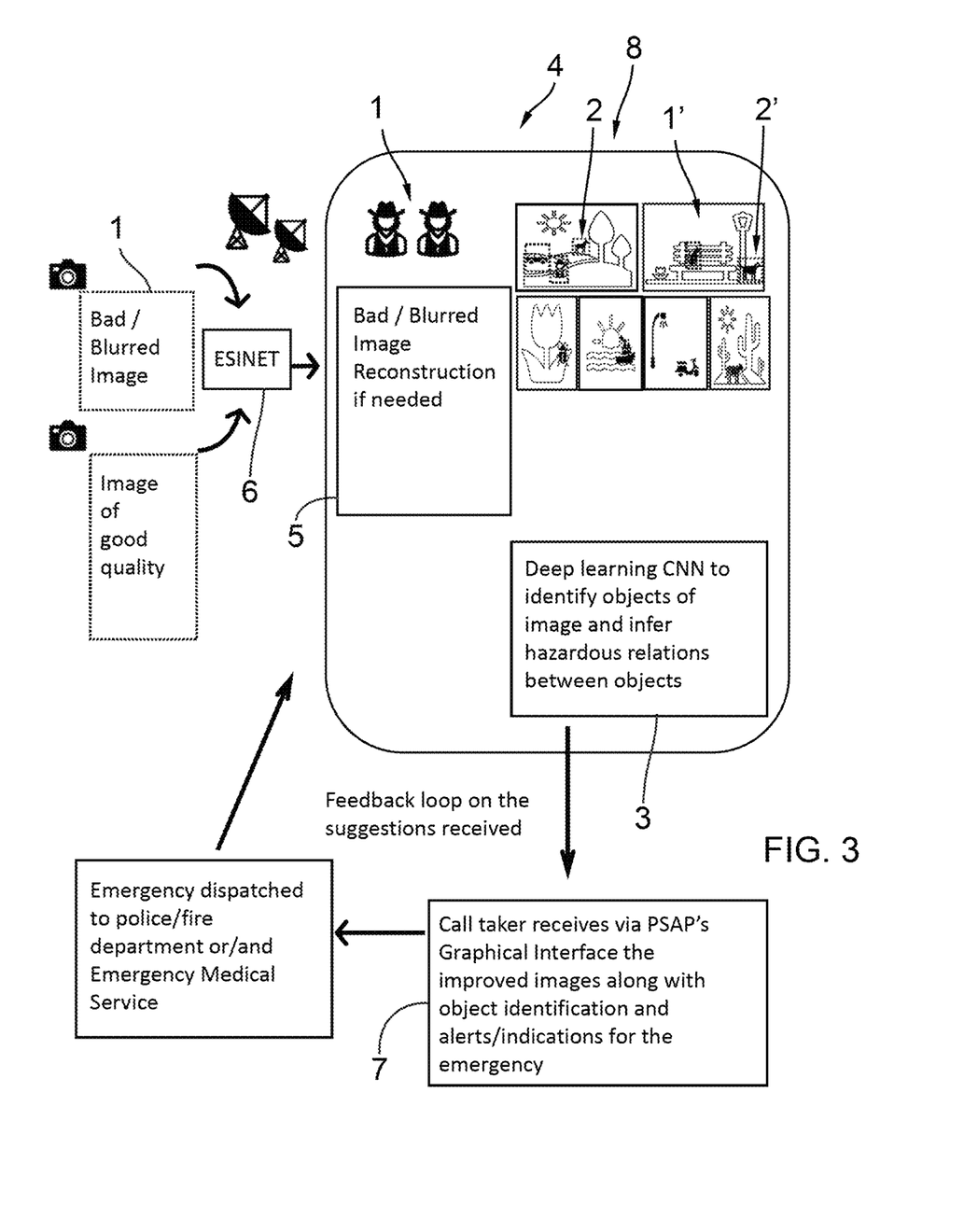
FIG. 3 shows an exemplary embodiment of high level architecture of a communication network for handling emergency incidents according to an embodiment of the invention.

FIG. 3 shows a high level architecture of a communication network 4 for handling emergency incidents according to an embodiment of the invention. The communication network 4 can include devices that are adapted to utilize an embodiment of our method.

Images 1, 1' that are taken of emergency incidents via an emergency caller smartphone, table, camera, or other type of electronic device can be transmitted to a PSAP 7 via the Emergency Service IP Network (ESINET) 6. Prior to being handled by a recipient, the emergency incident depicted on an image is processed in an emergency processing unit 8 that performs image correction as described with respect to FIG. 1A and FIG. 1B in an image correction unit 5 and that also performs the recognition and classification of objects 2, 2' (see FIGS. 2A and 2B) of an emergency scene shown on the images 1, 1' received in a deep learning unit 3, as described with respect to FIGS. 2A-2F. It should be appreciated that the emergency processing unit 8 is a computer device that can include a processor connected to a non-transitory computer readable medium that has code stored thereon that defines methods that can be performed by the computer device when the code is run by the processor. The code can configured the computer device to perform different functions. The emergency processing unit 8 can also include (and/or be communicatively connected to) at least one input device, at least one output device, and/or at least one input/output device (e.g. a touchscreen). The emergency processing unit 8 can also include at least one transceiver unit connected to the processor for communicatively connecting to other devices (e.g. emergency call devices, one or more PSAPs, etc.). In some embodiments, the emergency processing unit 8 can include a set of computer devices that are communicatively connected to each other. For instance, one computer device of the emergency processing unit 8 can be configured as the image correction unit 5 and another computer device of the emergency processing unit 8 can be configured as the deep learning unit 3.

After the object recognition and classification step described with respect to FIGS. 2A-2F, this output—namely, the identified objects—is fed as input to a complex deep learning algorithm that defines a data efficient Relation Network (RN) architecture. The above described unit is an artificial neural network component with a structure that is able to infer relations among objects, as the objects 2, 2' in images 1, 1' of FIGS. 2A and 2B. This exemplary neural network technology can consist of or include Long Short-Term Memory (LSTM) architectures that is able to deduce the relations between a given set of objects (as the objects 2 in image 1 of FIG. 2A, or the objects 2' of image 1' in FIG. 2B) using associations like spatial relevance. Implementations of this type of architecture can respond correctly to smaller scale tasks with high reliability with respect to deducing the relation for the objects of an image with a pool of 5-10 recognized objects.

This pool of objects may be enlarged, whereby only objects should be included that are relevant for the emergency classification. Accordingly, an equivalent RN can be composed and be provided with an emergency perspective and criteria to attain an understanding of hazardous relations between the objects (as the objects 2 of image for the objects 2' of image 1' in FIGS. 2A and 2B). This unit or component can be "taught" under human supervision using an expanding dataset of pictures taken from emergency situations. The "teacher" will be feeding the dataset with images along with the set of existing objects which are labeled as "emergency related" and a set of true suggestions describing the relation between each one of these objects emergency-wise, e.g. sharp object/weapon with a human in the picture will be assessed as hazardous situation. This way, a risk map is created inside the neural network that provides an insight of which objects in combination with some other object or objects may cause a critical situation in an image. Namely, as the image (e.g., image 1 of FIG. 2A) shows an emergency incident as a primary hazardous situation, a secondary hazardous situation may be caused by other objects in the vicinity of the primary hazardous situation. For example, a fire as a primary hazardous situation, may cause an explosion as a secondary hazardous situation, in case explosive or inflammable materials are nearby so that the recipient of the call, as a first responder, is able to deal with the one or more secondary hazardous situations when handling the first hazardous situation.

Also, the learning process can continue with the method of backpropagation as the emergency dispatchers will provide sentences of what happened in the scene. This process provides a machine understanding of what is crucial for or in the emergency scene shown on an image that has been received, and what is not, and accordingly, the recipient of the emergency call, as a first responder, will be alerted as to the one or more secondary hazardous situations in an emergency incident shown on an image.

At the PSAP 7, the recipient of the emergency call will receive the corrected image or images of an emergency incident as well as the original images sent by the caller reporting the emergency incident via the emergency processing unit 8 or other element of the ESINET. Further, the recipient will receive, from the emergency processing unit 8, an object identification of the objects 2 or 2' that have been identified on the respective images 1 or 1' together with alerts for possible secondary hazardous situations that have been verified on the respective images 1 or 1'. The information received, namely, the information on the emergency incident itself as a primary hazardous situation and the information on possible further secondary hazardous situations may then be handled accordingly by the recipient at the PSAP 4, for example, by informing the police and/or fire department on the emergency incident.

Figure 4:
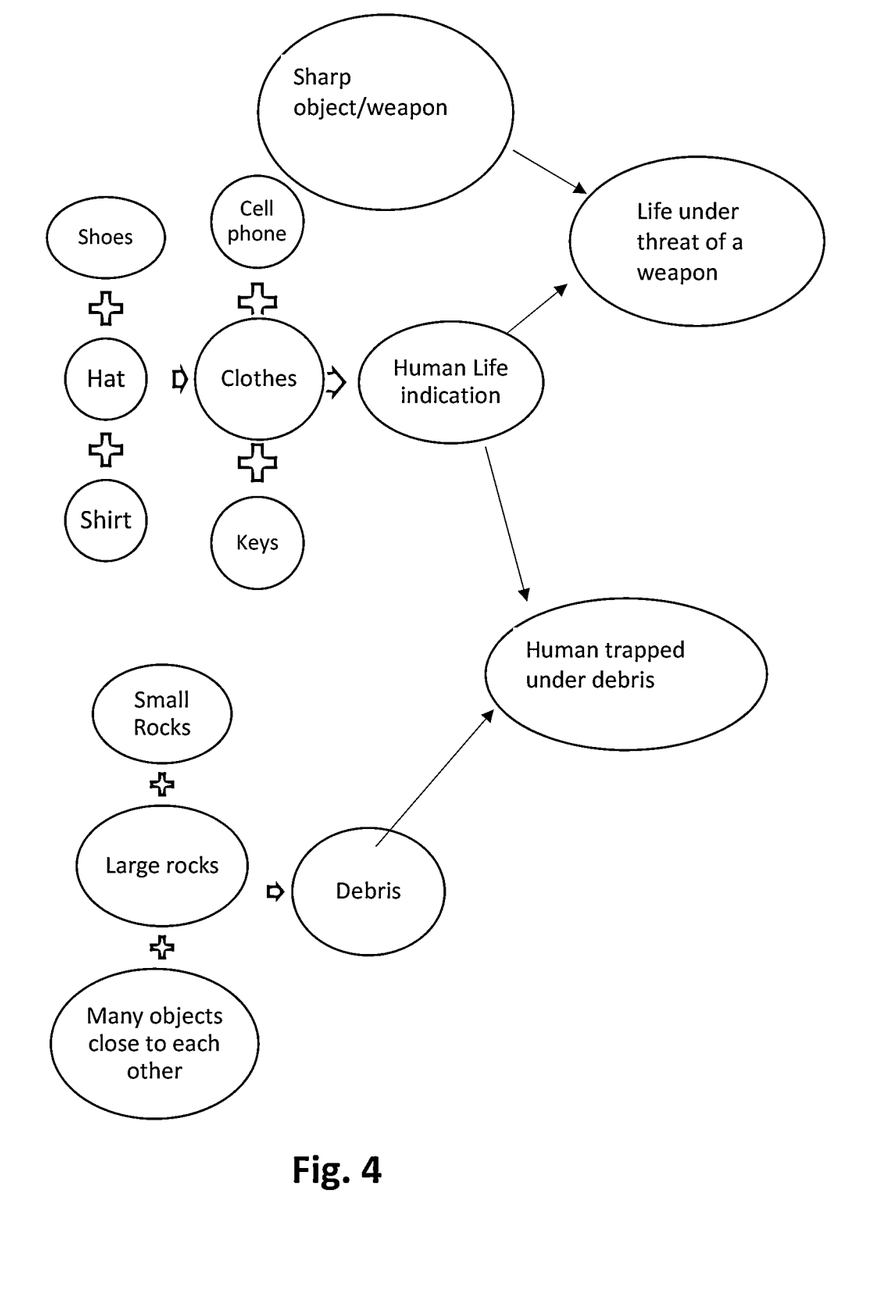
FIG. 4 illustrates an exemplary process for how an emergency situation is deduced from a plurality of objects identified on an image according to an embodiment of the invention.
Figure 5:
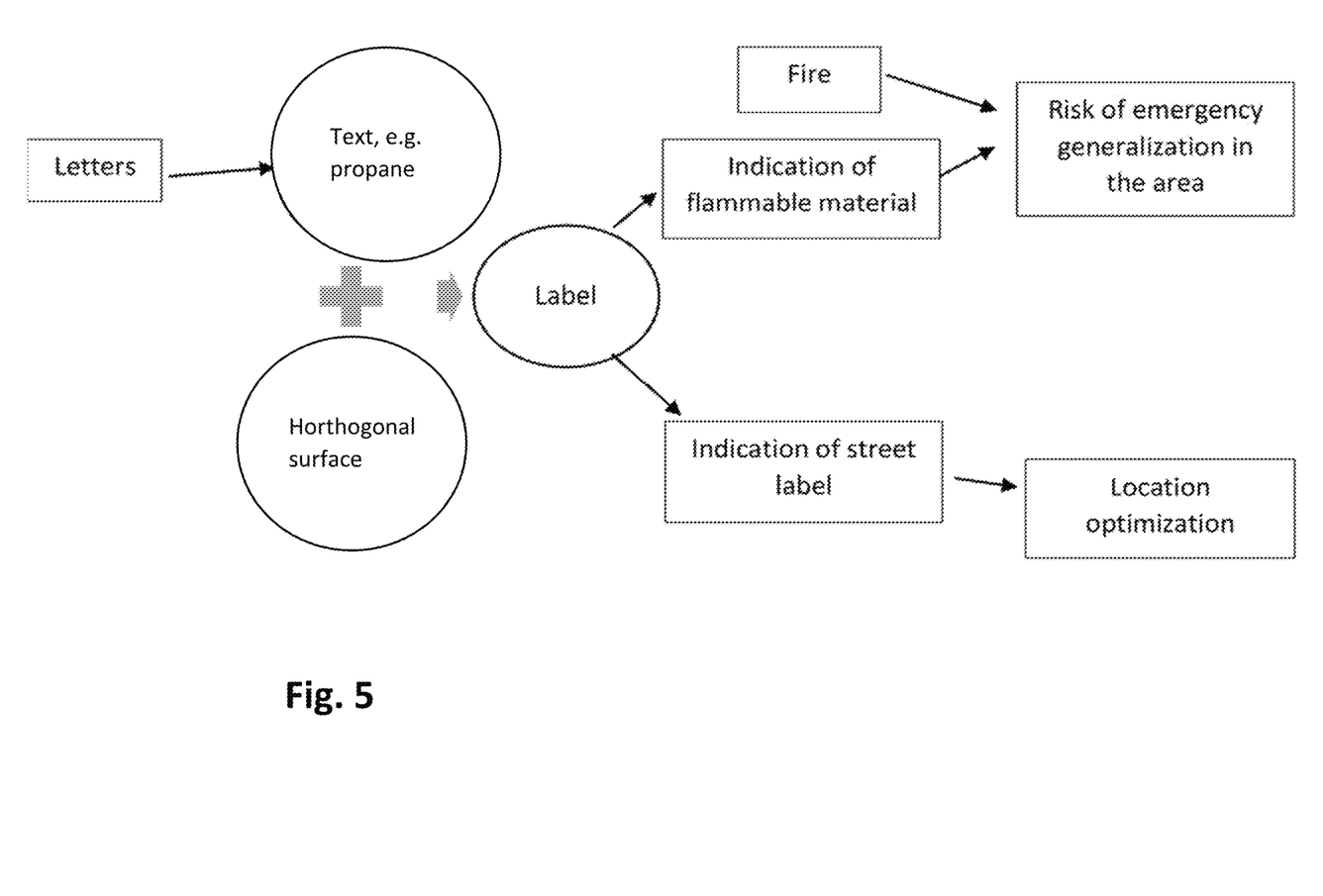
FIG. 5 illustrates an exemplary process for how an emergency situation is deduced from a plurality of objects identified on an image according to an embodiment of the invention.

FIGS. 4-5 illustrate how an emergency situation may be deduced from a plurality of objects 2 or 2' identified on an image 1 or 1' that has been sent for reporting an emergency incident by comparison and classification according to a set of recognized objects stored in a database. For example, in the example of FIG. 4, if the objects "shoes", "hat", and "shirt" have been identified on an image 1, then these objects are assigned to the object category "clothes". If further objects comprising, for example, "cell phone" have been identified, then it is concluded that this refers to "human life indication". As a further object that has been identified on the image received is a sharp object that has been assigned to the category of "weapons", then it is concluded that the life of a human may be threatened by a weapon.

Another set of objects "small rocks", "large rocks", and "many objects close to each other" have been combined to "debris" that in combination with the objects mentioned above lead to the conclusion that a human may be trapped inside debris.

A further example shown in FIG. 5 is related to the recognition of letters on an image 1. The letters combine to text, as the word "propane", that in combination with an object "orthogonal surface" is categorized as a "label". If the label indicates flammable material, this will lead to the conclusion that a generally hazardous situation may occur. If the label indicates a street or the like, then this information may be used for location optimization.

Thus, by the method of handling an emergency incident according to the embodiments described above, "secondary" details in an image that are not immediately related to the entire emergency scene or incident and that would otherwise be neglected or overseen by a person may be identified and correlated to hazardous situations that may occur. For example, as already outlined above, if there is an obvious fire in the emergency scene, the emergency agent would accordingly send firefighters to handle the situation. However, if there is a label on an object that indicates, for example, flammable material or a school sign or the like that would be overseen by the person handling the emergency, the method can result in also identifying secondary hazardous situations caused by such objects and will provide a corresponding alert to the call recipient who thus is enabled to manage the entire situation appropriately, thereby reducing the risks.

Finally, it is noted that it is also possible to train the algorithm in the early process to provide some suggestions for what type of precautionary actions should be taken in dangerous situations. For example, after alerting that there may be a human buried under debris of a landslide, a suggestion may be output to send life rescuers capable to extracting a person from such debris to the emergency location.

It should be appreciated that different embodiments of the method, communication system, and a communication apparatus can be developed to meet different sets of design criteria. For example, the particular type of network connection, server configuration or PSAP configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a PSAP, an ESINET, an emergency processing unit, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of handling an emergency incident reported to a Public Safety Answering Point PSAP the method comprising:
   receiving information on the reported emergency incident, the information comprising at least one image of the reported emergency incident showing the emergency incident as an unknown primary hazardous situation,
   applying a Convolutional Neural Network, CNN, object recognition and classification process for identifying and marking objects on the at least one image, the identified and marked objects being part of a defined set of identifiable emergency objects;
   processing data relating to the identified and marked objects by applying a deep learning algorithm to the data in a Relational Network (RN) architecture designed to attain an understanding of hazardous relations between emergency objects, the hazardous relations causing at least one secondary hazardous situation, to infer hazardous relations between the identified and marked objects; and
   outputting an alert in response to verification that the at least one secondary situation may occur.

2. The method of claim 1, wherein the RN has a Long-Short-Term-Memory (SLTM) architecture.

3. The method of claim 1, comprising applying image processing to the at least one image using image correction software run by an emergency processing unit that is communicatively connectable to the PSAP.

4. The method of claim 1, wherein the CNN is applied based on convolution and max pooling.

5. The method of claim 1, wherein the primary hazardous situation is a fire the at least one secondary hazardous situation includes inflammable materials.

6. The method of claim 1, further comprising providing a suggestion for handling the primary hazardous situation and a suggestion for handling the at least one secondary hazardous situation.

7. A communication apparatus for handling emergency incidents, the communication apparatus comprising:
   an emergency processing unit communicatively connectable to an Emergency Service Network (ESINET) via which information on emergency incidents are exchangeable with a Public Safety Answering Point (PSAP), the emergency processing unit comprising a processor connected to a non-transitory computer readable medium having code stored thereon, the code defining a method that is performed by the emergency processing unit when the processor runs the code, the method comprising:
   receiving via the ESINET information on a reported emergency incident, the information comprising at least one image of the emergency incident showing the emergency incident as an unknown primary hazardous situation,
   applying a Convolutional Neural Network, CNN, object recognition and classification process for identifying and marking objects on the at least one image, the identified and marked objects being part of a defined set of identifiable emergency objects;
   processing data relating to the identified and marked objects by applying a deep learning algorithm to the data in a Relational Network (RN) architecture designed to attain an understanding of hazardous relations between emergency objects, the hazardous relations causing at least one secondary hazardous situation, to infer hazardous relations between the identified and marked objects.

8. The communication apparatus of claim 7, wherein the emergency processing unit comprises a deep learning unit and an image correction unit.

9. The communication apparatus of claim 7, wherein the emergency processing unit comprises a deep learning unit.

10. The communication apparatus of claim 7, wherein the emergency processing unit comprises an image correction unit.

11. The communication apparatus of claim 7, further comprising the ESINET and the PSAP.

* * * * *